United States Patent
Yamauchi et al.

(10) Patent No.: US 8,527,113 B2
(45) Date of Patent: Sep. 3, 2013

(54) REMOTE VEHICLE

(75) Inventors: Brian Masao Yamauchi, Boston, MA (US); Kent Conway Massey, Villanova, PA (US); David Aaron Lafferty, North Billerica, MA (US)

(73) Assignee: iRobot Corporation, Bedford, MA (US)

( * ) Notice: Subject to any disclaimer, the term of this patent is extended or adjusted under 35 U.S.C. 154(b) by 276 days.

(21) Appl. No.: 12/853,277

(22) Filed: Aug. 9, 2010

(65) Prior Publication Data

US 2011/0054717 A1    Mar. 3, 2011

Related U.S. Application Data

(60) Provisional application No. 61/232,051, filed on Aug. 7, 2009.

(51) Int. Cl.
*G05D 3/20*    (2006.01)

(52) U.S. Cl.
USPC ................................. 701/2; 701/28

(58) Field of Classification Search
USPC ....................................... 701/2, 28
See application file for complete search history.

(56) References Cited

U.S. PATENT DOCUMENTS

| | | | |
|---|---|---|---|
| RE39,528 E * | 3/2007 | Kanehisa et al. | 301/110.5 |
| 7,363,994 B1 * | 4/2008 | DeFazio et al. | 180/22 |
| 2008/0086241 A1 * | 4/2008 | Phillips et al. | 701/2 |
| 2008/0179115 A1 * | 7/2008 | Ohm et al. | 180/9.21 |

OTHER PUBLICATIONS

Yamauchi, Brian, "PackBot: A Versatile Platform for Military Robotics", In Proceedings of SPIE vol. 5422, Unmanned Ground Vehicle Technology VI, Orlando, FL, Apr. 2004, 10 pages.*
Yamauchi, Brian. "All-Weather Perception for Small Autonomous UGVs". In Proceedings of SPIE Defense and Security Conference, Orlando, FL, Mar. 2008.
Lenser, Scott et al., "Practical problems in sliding scale autonomy: A case study". In Proceedings of SPIE Defense and Security Conference, Orlando, FL, Mar. 2008.
Cheung, Carol et al., "UAV-UGV Collaboration with a PackBot UGV and Raven SUAV for Pursuit and Tracking of a Dynamic Target". In Proceedings of SPIE Defense and Security Conference, Orlando, FL, Mar. 2008.
Schoenfeld, Erik et al., "Door Breaching Robotic Manipulator". In Proceedings of SPIE Defense and Security Conference, Orlando, FL, Mar. 2008.

(Continued)

*Primary Examiner* — Mary Cheung
*Assistant Examiner* — Yuen Wong
(74) *Attorney, Agent, or Firm* — Myers Bigel Sibley & Sajovec, P.A.

(57) ABSTRACT

A system for providing enhanced operator control of a remote vehicle driving at increased speeds comprises: a head-mounted display configured to be worn by the operator and track a position of the operator's head; a head-aimed camera mounted to the remote vehicle via a pan/tilt mechanism and configured to pan and tilt in accordance with the position of the operator's head, the head-aimed camera transmitting video to be displayed to the operator via the head-mounted display; and a computer running a behavior engine, the computer receiving input from the operator and one or more sensors, and being configured to utilize the behavior engine, operator input, sensor input, and one or more autonomous and/or semi-autonomous behaviors to assist the operator in driving the remote vehicle. The remote vehicle includes releasably mounted wheels and high-friction tracks.

22 Claims, 6 Drawing Sheets

(56) References Cited

OTHER PUBLICATIONS

Yamauchi, Brian. "Daredevil: Ultra Wideband Radar Sensing for Small UGVs", In Proceedings of SPIE: Unmanned Systems Technology IX, Orlando, FL, Apr. 2007.
Rudakevych, Pavlo et al., "Integration of the Fido Explosives Detector onto the PackBot EOD UGV", In Proceedings of SPIE vol. 6561, Mar. 2007.
Rudakevych, Pavlo et al., "A man portable hybrid UAV/UGV system", In Proceedings of SPIE vol. 6561, Mar. 2007.
Jones, Chris et al., "Sentinel: An Operator Interface for the Control of Multiple Semi-Autonomous UGVs", In Proceedings of the Association for Unmanned Vehicles Systems International. Orlando, FL, Aug. 2006.
Yamauchi, Brian. "Autonomous Urban Reconnaissance Using Man-Portable UGVs", In Proceedings of SPIE: Unmanned Ground Vehicle Technology VIII, Orlando, FL, Apr. 2006.
Yamauchi, Brian. "Wayfarer: An Autonomous Navigation Payload for the PackBot", In Proceedings of AUVSI Unmanned Vehicles North America 2005, Baltimore, MD, Jun. 2005.
Barnes, Mitch et al., "ThrowBot: Design Considerations for a Man-Portable Throwable Robot", In Proceedings of SPIE vol. 5804, Mar. 2005.
Rudakevych, Pavlo et al., "PackBot EOD Firing System", In Proceedings of SPIE vol. 5804, Mar. 2005.
Yamauchi, Brian. "The Wayfarer Modular Navigation Payload for Intelligent Robot Infrastructure", In Proceedings of SPIE vol. 5804: Unmanned Ground Technology VII, Orlando, FL, Mar. 2005.
Yamauchi, Brian et al., "Griffon: a man-portable hybrid UGV/UAV", In Industrial Robot: An International Journal, vol. 31 No. 5, 2004.
Yamauchi, Brian. "PackBot: A Versatile Platform for Military Robotics", In Proceedings of SPIE vol. 5422: Unmanned Ground Vehicle Technology VI, Orlando, FL, Apr. 2004.
Sword, Lee et al., "Mobility Enhancements for Ballistically Deployed Sensors", In Proceedings of SPIE vol. 4393, Apr. 2001.
Rudakevych, Pavlo. "Wave Control: A Method of Distributed Control for Repeated Unit Tentacles", In Proceedings of SPIE vol. 3839, Aug. 1999.
Rudakevych, Pavlo et al., "Micro Unattended Mobility System (MUMS)", In Proceedings of SPIE vol. 3713, Jul. 1998.
Murray, Sean et al., "Continued Research in EVA, Navigation, Networking and Communications Systems", SAE Proceedings, International Conference on Environmental Systems, Jun. 2008.
Massey, K., "Head-Aimed Vision System Improves Tele-Operated Mobility," Mobile Robots XVII, Proceedings of SPIE vol. 5609 (SPIE, Bellingham, WA, 2004), pp. 128-134.
Yamauchi, B., "Autonomous urban reconnaissance using man-portable UGVs," Society of Photo-Optical Instrumentation Engineers, 2006, 11 pages.
Yamauchi et al, "Stingray: High-speed control of small UGVs in urban terrain", Proceedings of SPIE, vol. 7332, 2009.
Yamauchi et al., "Stingray: High-Speed Teleoperation of Ugvs in Urban Terrain Using Driver-Assist Behaviors and Immersive Telepresence" Proceedings of Army Science Conference ($26^{th}$), Orlando, Florida, Dec. 2008.

\* cited by examiner

REMOTE VEHICLE

RELATED APPLICATION INFORMATION

This application claims the benefit of and priority from U.S. Provisional Patent Application Ser. No. 61/232,051, filed Aug. 7, 2009, the disclosure of which is incorporated herein by reference in its entirety.

STATEMENT OF GOVERNMENT SUPPORT

This invention was made with Government support under contract no. W56 HZV-09-C-0050, awarded by the U.S. Army (TACOM/TARDEC). The Government has certain rights in the invention.

The invention described herein may be manufactured and used by, or for the Government of the United States for governmental purposes without the payment of any royalties thereon.

The present teachings provide a remote vehicle with increased speed capabilities. Various embodiments of the present teachings can provide a remote vehicle with selectively increased speed capabilities or temporarily increased speed capabilities.

BACKGROUND

Existing small unmanned ground vehicles (UGVs) are presently limited to speeds of less than about 6 mph. Such limited speed capabilities can be undesirable when the UGV must be driven a long distance to a target or when time is of the essence in an operation. Further, existing UGV implementations may be difficult to control at high speeds. For example, existing small UGVs need to steer around obstacles that larger vehicles could simply driver over. In addition, a bump that would typically be absorbed by a large vehicle's suspension can send a small, fast-moving UGV flying into the air.

In certain instances, the cleated (high traction) tracks currently used on many small UGVs drain a great deal of power when trying to operate the UGV at increased speeds. Detracking (tracks separating from their associated drive bus (also referred to as pulleys)) can also become possible at high speeds. However, the tracks found on many UGVs provide a desirable stability and ability to climb large obstacles and stairs. Flippers, which are commonly found on such UGVs, are also desirable because they provide an increased forward offset for articulated platforms.

For remote vehicle's having articulated platforms such as manipulator arms used in EOD operations, which can change a center of mass of the remote vehicle as they are added to the remote vehicle and/or move with respect to the remote vehicle, high-speed driving ability and/or stability can be affected by any resulting change in the vehicle's center of mass.

When a vehicle oversteers, its rear tires lose traction before the front tires, which can cause the vehicle to turn more than commanded. Vehicles with more weight on the rear wheels tend to oversteer more easily. When a vehicle understeers, its front tires lose traction before its rear tires, causing the vehicle to turn less than commanded. Vehicles with more weight on the front wheels tend to understeer more easily. Vehicles having roughly equal weight over both axles tend to have more neutral handling, meaning that they are less likely to understeer and oversteer, and that either oversteer or understeer can be based on control inputs. Understeer is almost always undesirable, whereas skilled drivers can utilize oversteer to take turns faster than otherwise possible. Using oversteer advantageously, a driver can intentionally cause the rear wheels of a vehicle to break free and slide, steer toward an exit point of the curve, and then hit the throttle to break out of the slide. Done properly, this technique allows a vehicle to maintain a higher speed through a turn.

SUMMARY

The present teachings provide a remote vehicle comprising: a chassis; a main track drive shaft spanning a width of the chassis; at least one other shaft spanning a width of the chassis substantially parallel to the main track drive shaft; first and second hubs connected to the main track drive shaft on opposite sides of the main track drive shaft, and third and fourth hubs connected to the other shaft on opposite sides of the other shaft. The first and second hubs are rotated by the main track drive shaft. The first and third hubs are located on a first side of the remote vehicle and the second and fourth hubs are located on a second side of the remote vehicle. The remote vehicle also comprises a first main track surrounding, engaging, and extending between the first and third hubs on a first side of the chassis, and a second main track surrounding, engaging, and extending between the second and fourth hubs on a second side of the chassis. The first main track is driven by rotation of the first hub and the second main track is driven by rotation of the third hub. A wheel is connected directly or indirectly to each of the first, second, third, and fourth hubs, the wheel having a diameter that is greater than a diameter of a hub to which it is connected and being configured to directly contact a driving surface in use.

The present teachings also provide a system for providing enhanced operator control of a remote vehicle driving at increased speeds. The system comprises: a head-mounted display configured to be worn by the operator and track a position of the operator's head; a head-aimed camera mounted to the remote vehicle via a pan/tilt mechanism and configured to pan and tilt in accordance with the position of the operator's head, the head-aimed camera transmitting video to be displayed to the operator via the head-mounted display; and a computer running a behavior engine, the computer receiving input from the operator and one or more sensors, and being configured to utilize the behavior engine, operator input, sensor input, and one or more autonomous and/or semi-autonomous behaviors to assist the operator in driving the remote vehicle.

The present teachings further provide a method for operating a remote vehicle comprising both high-friction tracks and wheels having a diameter that is greater than hubs around which the high-friction tracks extend, each wheel being selectively engaged with a corresponding hub. The method comprises: driving the remote vehicle to a destination at a high speed using a head-aimed camera and a head-mounted display while the wheels are selectively engaged; jettisoning the wheels upon arriving at the destination; and driving remote vehicle at a slower speed using the high-friction tracks after the wheels have been jettisoned.

Additional objects and advantages of the present teachings will be set forth in part in the description which follows, and in part will be obvious from the description, or may be learned by practice of the teachings. The objects and advantages of the present teachings can be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate an exemplary embodiment of the present teachings and, together with the description, serve to explain the principles of those teachings.

DESCRIPTION OF THE EMBODIMENTS

Reference will now be made in detail to exemplary embodiments of the present teachings, examples of which are illustrated in the accompanying drawings.

Figure 1:
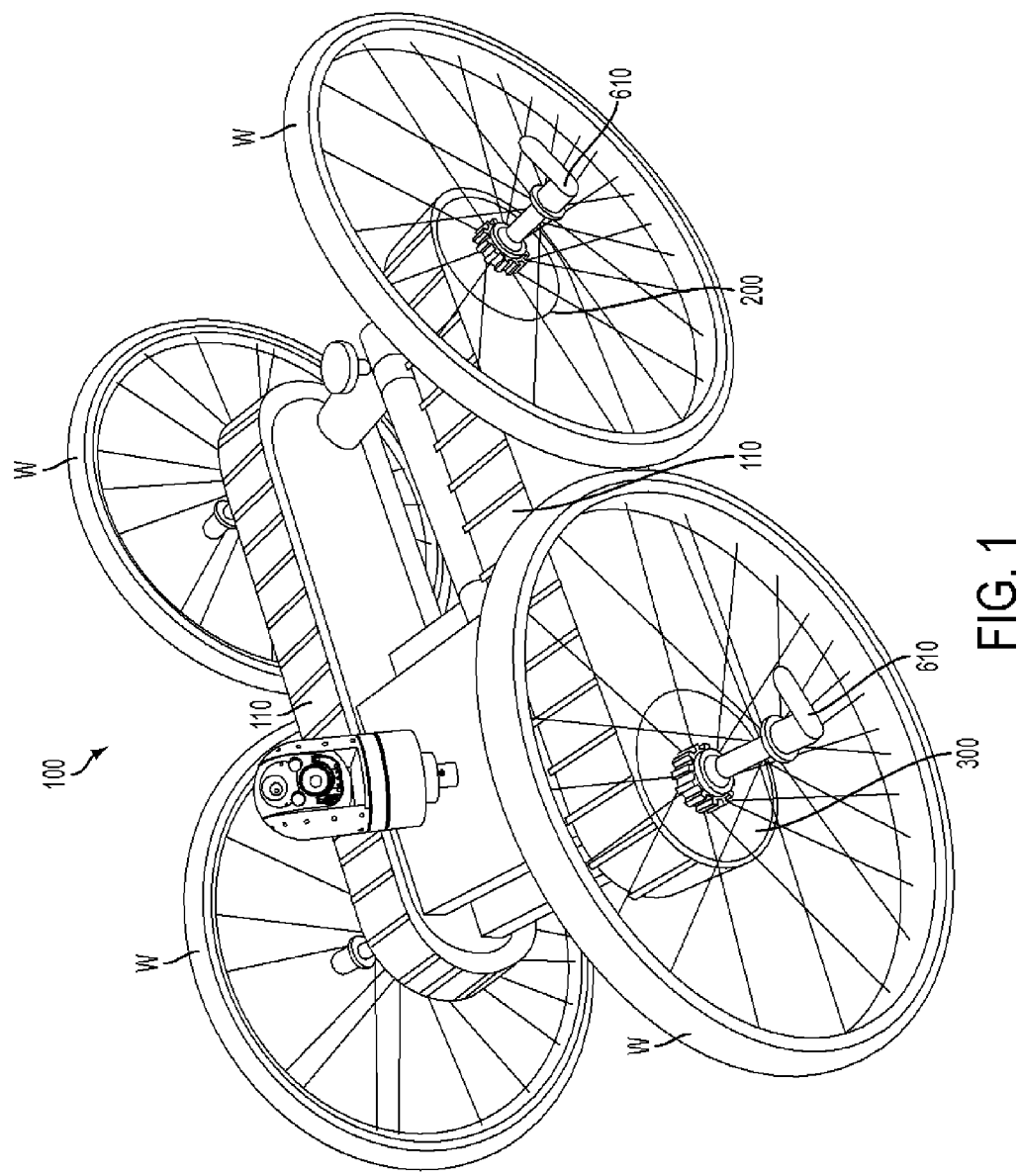
FIG. 1 illustrates an exemplary embodiment of a small unmanned ground vehicle in accordance with certain embodiments the present teachings.

The present teachings provide a remote vehicle capable of increased speed, and combine immersive telepresence (for increasing an operator's situational awareness in his own environment and/or in an environment of a remote vehicle) with semi-autonomous driver-assisted behaviors (for reducing an operator's cognitive load when maintaining situational awareness while controlling a remote vehicle at higher speeds) that command the remote vehicle to safely maneuver according to the driver's intent. A remote vehicle, such as an iRobot® PackBot® or Warrior™ 700 (described in more detail below), portions of the chassis of which are illustrated in FIG. 1, can be modified as described below for high-speed operation.

Figure 2:
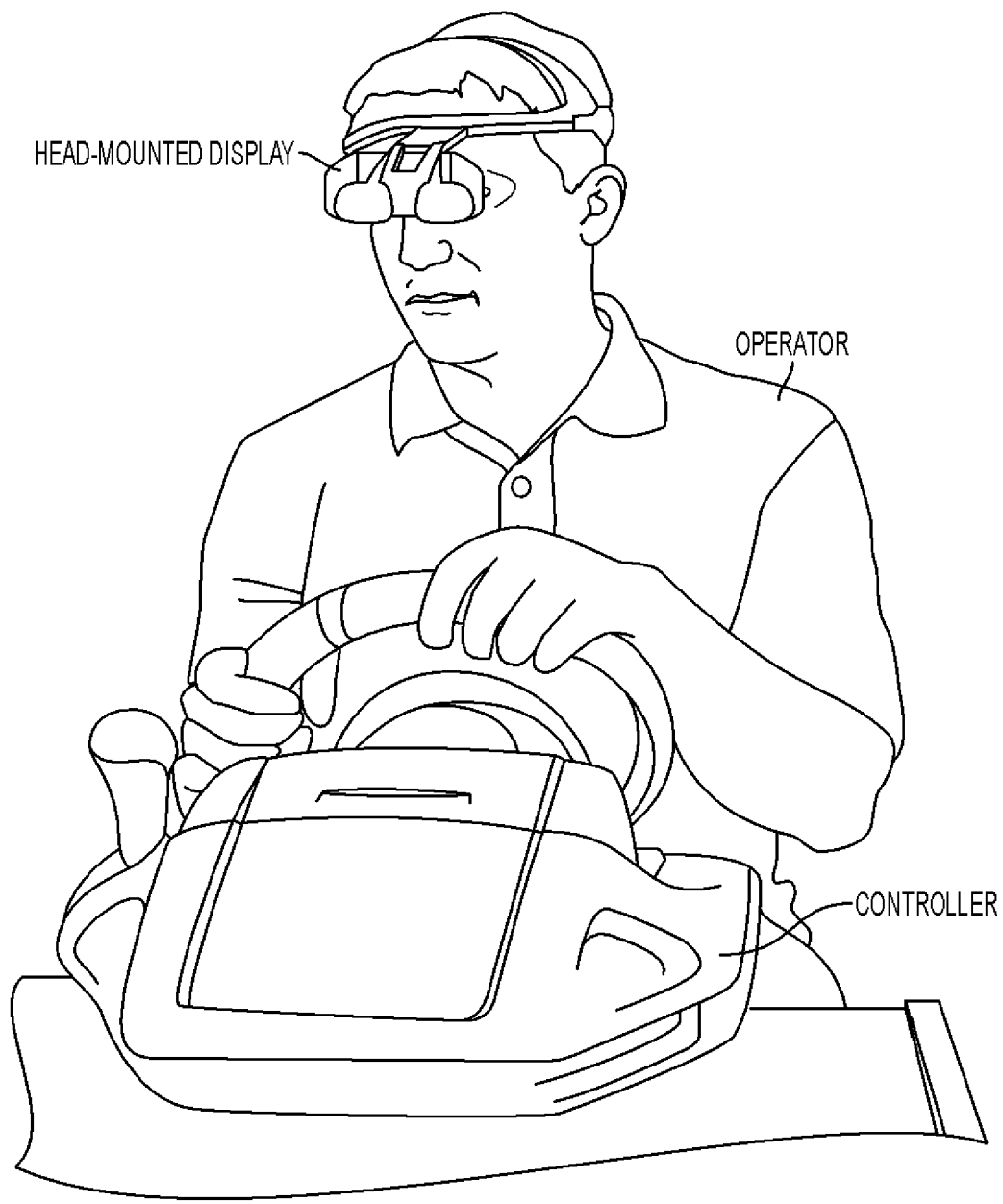
FIG. 2 illustrates a head-mounted display and a controller for use in accordance with certain embodiments of the present teachings.
Figure 3:
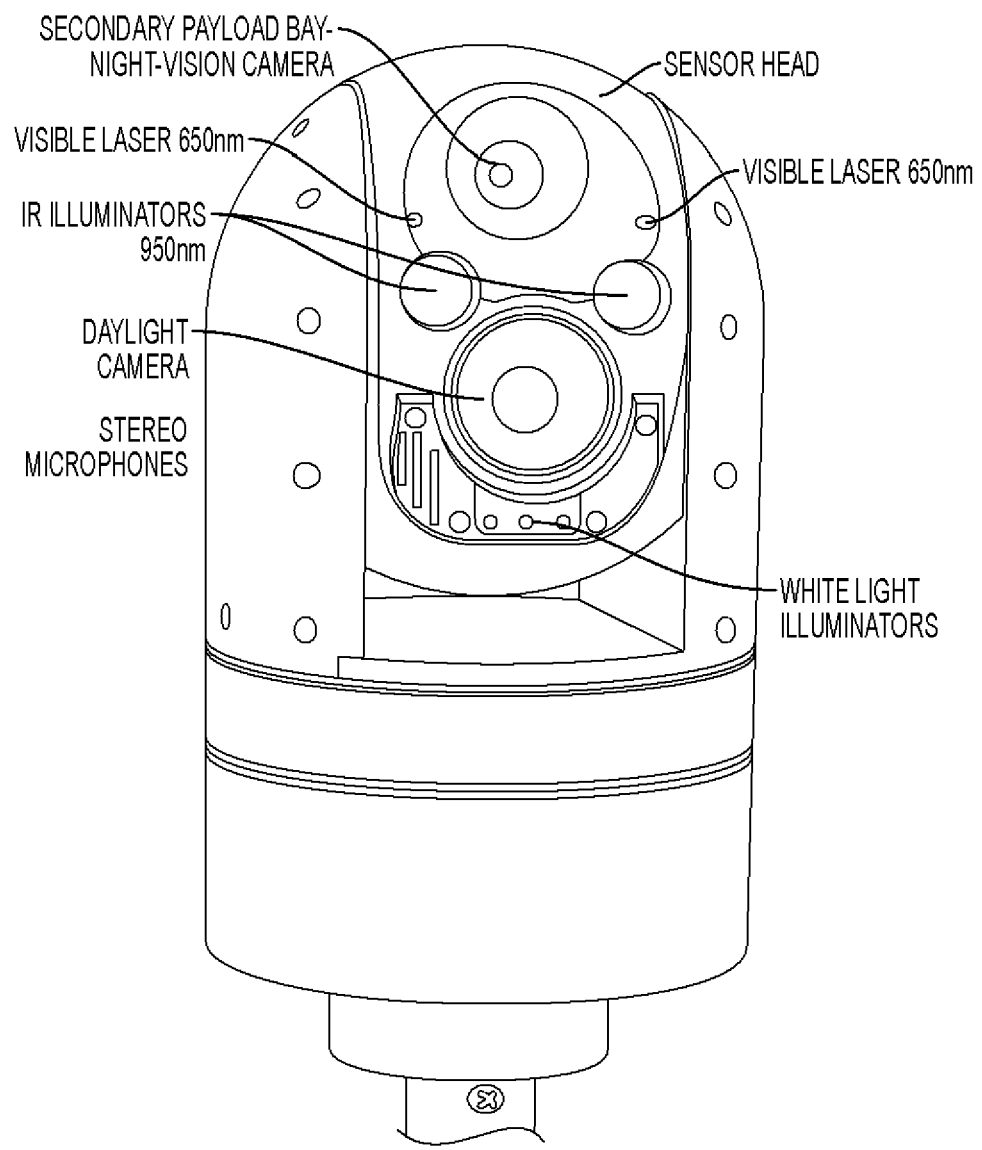
FIG. 3 illustrates sensor head for use in accordance with certain embodiments of the present teachings.

Immersive telepresence can be achieved for use in accordance with certain embodiments of the present teachings by integrating, for example, a head-mounted display (see FIG. 2) and head-aimed cameras (see FIG. 3) to provide an operator with an illusion of being in the vehicle itself. One exemplary head-mounted display and head tracker for immersive telepresence that can be employed in accordance with the present teachings includes a Chatten Head-Aimed Remote Viewer (HARV), which is illustrated in FIG. 2. The head-aimed camera, such as the exemplary HARV camera illustrated in FIG. 3, can be mounted on the remote vehicle via a pant/tilt/roll gimbal. An exemplary embodiment of a HARV head-mounted camera is illustrated in FIG. 3 and includes, as shown, a night vision camera, a visible laser, in infrared laser, two infrared illuminators, a daylight camera, white light illuminators, and stereo microphones. Thus, the illustrated head-aimed camera can be utilized in illuminated and non-illuminated environment, providing the operator with infrared "night vision" when needed, and can additionally transmit sound captured by the microphones to the operator.

The HARV can have its own power source or it can receive, for example, regulated 24V power from the remote vehicle's unregulated 48V system voltage by using a DC-DC power converter. The HARV can cooperate with the head-mounted display to track the operator's head position and turn the camera to face in the same direction. An exemplary head-mounted display for use in immersive telepresence includes a Fakespace Labs Wide5 Head Mounted Display. The present teachings contemplate employing varying levels of immersive telepresence, from creating the illusion of being in the vehicle itself with a Chatten-like or Fakespace-like head-mounted display to having one eye immersed in the environment of the remote vehicle while the other eye maintains situational awareness of the operator's environment. More detail regarding the Chatten head-aimed camera and head-mounted display are available in Massey, *Head-Aimed Vision System Improves Tele-operated Mobility*, Mobile Robots XVII, Proceedings of SPIE, Volume 5609, pp. 128-134 (2004), the entire content of which is incorporated herein by reference.

FIG. 2 illustrates an exemplary implementation of an operator driving a remote vehicle using a HARV head-mounted display and a controller. The operator wears the head-mounted display showing a current view through the head-aimed camera on the remove vehicle (see FIG. 3) and a head tracker that monitors the operator's head position. As the operator moves his head, the head-mounted display sensed the operator's head movement, the head-mounted display, the controller, or the head-aimed camera use the data regarding the operator's head movement to turn a gimbal on the remote vehicle, which automatically turns the head-aimed camera on the remote vehicle to face in a direction corresponding to the operator's current head position as determined by the head tracker. This can provide a more simplified, intuitive, and immersive experience than having the operator aim camera(s) on the remote vehicle with a joystick while operating the remote vehicle.

In certain embodiments of the present teachings employing a head-aimed camera and a head-mounted display for immersive telepresence, analog video can be transmitted from the head-aimed camera to the operator's head-mounted display via a transmitter, such as a 2.4 Ghz transmitter, and digital commands from the head-mounted display can be transmitted to update the head-aimed camera position on, for example, a separate channel at 900 MHz.

In the absence of a head-mounted display or in addition to the head mounted display, analog video from the head-aimed camera can be transmitted to an operator control unit, for example via the 2.4 Ghz transmitter.

Control systems in accordance with certain embodiments of the present teachings employ autonomous and/or semi-autonomous driver-assist behaviors for use in accordance with the present teachings. Employment of the autonomous and/or semi-autonomous behaviors can be facilitated by providing the remote vehicle with and integrating, for example, a payload that provides at least a range finder such as LIDAR. The payload can also include a computational component. Exemplary driver-assist autonomous and semi-autonomous behaviors can include obstacle avoidance, following a predetermined heading, street following, and perimeter following. Street-following and perimeter-following behaviors can use LIDAR to determine the orientation of features such as street boundaries, building walls, and tree lines.

Obstacle avoidance behaviors are known in the art, and can use, for example, a randomized Monte Carlo algorithm and other methods for generating potential paths and then evaluate those paths based at least in part on behavior input and obstacle detection. An obstacle avoidance behavior can provide a guarded motion capability that steers the remote vehicle in a direction commanded by the operator or another behavior, if possible, but also steers around any obstacles within its path. An obstacle avoidance behavior can be integrated with autonomous capabilities (such as perimeter-following and street-following) as part of an overall behavior engine controlling the remote vehicle. In an autonomous mode, behaviors such as perimeter-following and street-following can supply desired motion commands, and the obstacle avoidance behavior attempts to follow these commands as closely as possible, while also steering around any obstacles in the remote vehicle's path.

Certain known perimeter-following and street-following behaviors utilize a Hough Transform with range and other data to detect the orientation and location of walls and street features. A Hough Transform is a computer vision technique that works by transforming image point coordinates into votes in a parameter space of possible lines. Each point corresponds to a vote for all of the lines that pass through that point. By finding the strongest points in the parameter space, the Hough Transform can determine parameterized equations for the strongest lines in an image. A Hough Transform can process range data from, for example, LIDAR to calculate strongest line orientations and offsets relative to the remote vehicle's current position.

In an exemplary implementation of a perimeter-following behavior, the perimeter-following behavior attempts to steer the remote vehicle so that it is parallel to the strongest line detected by the Hough Transform. To prevent the remote vehicle from oscillating between two lines that are possibly the same strength, an accumulator array can be used to integrate the strength of line orientations over time. For computational efficiency, all lines with the same orientation vote for the same orientation, regardless of the range from each line to the remote vehicle. Orientations can be grouped into 5 degree bins for a total of 72 bins. The perimeter-following behavior can output a desired absolute heading in world coordinates. This desired absolute heading can be passed to an obstacle detection behavior/obstacle avoidance system, which can select an obstacle-free heading that is closest to the desired heading selected by the perimeter-following behavior. This allows the remote vehicle to reactively steer around obstacles that are located next to walls and then resume wall following. In such an embodiment employing a following behavior and obstacle avoidance, the remote vehicle operator can perform a supervisory role while these behaviors are guiding the remote vehicle, overriding the behaviors and teleoperating the remote vehicle only when necessary. Street following is similar to perimeter following, but tracks lines on both sides of the remote vehicle. Exemplary embodiments of a street-following and a perimeter-following behavior are set forth in more detail in Yamauchi, *Autonomous Urban Reconnaissance Using Man-Portable UGVs*, Unmanned Ground Vehicle Technology VIII, Proceedings of SPIE, Volume 6230, 62300S (2006), the entire content of which is incorporated by reference herein.

In accordance with certain embodiments of the present teachings, dynamic handling behaviors can be developed based on vehicle design and driving characteristics. Dynamic handling behaviors can be developed to put the remote vehicle into a configuration best suited for stability and/or performance for certain types of driving. For example, if an operator is commanding maximum speed in an essentially straight line, the dynamic handling behaviors can put the vehicle into a configuration to maximize straight-line speed. If the operator is commanding a hard right turn or a hard left turn at low speed, the behaviors will select a configuration that minimizes the vehicle turn radius. If the operator is commanding a hard turn at high speed, the dynamic handling behaviors can select a configuration maximizing speed and stability through the turn. It will be readily understood by those skilled in the art that the actual remote vehicle configuration selected by the dynamic handling behaviors will vary depending on the remote vehicle configuration, including any articulating components and added payloads.

A small, light-weight UGV driving at high speeds can spend a significant portion of its travel time in the air, particularly when traversing rough, off-road terrain. Thus, control of the remote vehicle must be maintained at high speeds despite a frequent loss of contact with the ground. A heading-control behavior (for example, utilizing an IMU and wherein a user presses a button commanding the robot to maintain its present heading) can allow the operator to specify a desired heading for the remote vehicle and command the remote vehicle to maintain that heading at a specified speed. IMU may provide instantaneous information. For example, IMU output may be integrated over time to get estimated actual heading. IMU is more accurate over short periods of time whereas GPS is more accurate long-term. Compass is accurate, but can be affected by metal and magnetic fields. In some embodiments, for heading control in general, general heading may be determined via GPS and IMU may be used for motor and steering changes. The heading-control behavior can be particularly useful at high speeds when continuous, rapidly-changing steering inputs are required to maintain the remote vehicle's heading if the remote vehicle loses contact with the ground and turns in the air. Like perimeter-following and street-following behaviors, the heading control behavior can free the operator to focus his attention on a surrounding environment, rather than being distracted by driving the vehicle.

In accordance with certain embodiments of the present teachings, a heading and speed control behavior takes a desired heading and desired speed as input. The speed and heading control behavior can include a proportional control loop to maintain the desired heading:

$$r = k(\theta_0 - \theta)$$

where r is the desired turn rate, k is the proportional gain, $\theta_0$ is the desired heading, and $\theta$ is the current heading. The default proportional gain is k=1. The current heading is estimated by the IMU in a known manner.

In accordance with various embodiments of the present teachings, the remote vehicle can be controlled by a controller as illustrated in FIG. 2, and/or via an operator control unit running, for example an iRobot® Aware 2.0 software architecture.

The iRobot® Aware 2.0 software architecture includes a behavior engine that can run, monitor, and control autonomous and semi-autonomous behaviors running on the remote vehicle. Indeed, a behavior engine can even override operator commands in certain desirable scenarios. Exemplary behavior engines are set forth in U.S. patent application Ser. No. 12/100,782, filed Apr. 10, 2008, and U.S. Provisional Patent Application No. 61/333,541, filed May 11, 2010, the entire content of both applications being incorporated by reference herein.

Certain embodiments of the present teachings contemplate additional or alternative behaviors being utilized to drive a remote vehicle at increased speeds. For example, a cruise control behavior and a weight-shifting behavior can be utilized. The weight-shifting behavior can move a weight situated on, for example, a pan/tilt mechanism to control the remote vehicle's weight distribution (and center of gravity), thereby controlling its oversteer and understeer. Cruise control can be used to maintain a given remote vehicle speed while allowing the operator or another behavior to control the remote vehicle's heading.

In certain embodiments of the present teachings, one or more payloads, including, for example, a head-aimed camera such as a HARV, can be mounted on the remote vehicle to provide inputs that can be used by one or more of the autonomous and/or semi-autonomous behaviors described herein that assist the remote vehicle operator. For example, for navigation behaviors such as obstacle avoidance, waypoint navigation, perimeter following, and street following, a payload can be provided that includes both a LIDAR. Stereo vision can additionally be provided and stereo vision data can be combined with LIDAR data to provide more accurate and informative 3D data. Also, an IMU can be included in a mounted payload to provide input for one or more heading-control behaviors.

In addition, remote vision systems (including, for example a head-aimed camera such as a Chatten HARV) only allow an operator to see a fraction of his normal viewing space, providing the operator with no peripheral vision. Peripheral vision preferably includes about a full 180° hemisphere. Certain embodiments of the present teachings can compensate for the restricted field of view from the remote vision system by adding cameras as inset views into the main image of a head-aimed vision system to increase situational awareness. In accordance with certain embodiments, a head-aimed camera such as a HARV can be modified by adding five small video cameras, for example of the type used in cell phones. Four of the cameras can be mounted at 90° spacing around a perimeter of a gimbal on a pan yoke ring on which the head-aimed camera is mounted, the pan yoke ring moving with the pan axis. These four cameras can be mounted to always have a fixed relationship with a viewing angle of the main display. In accordance with various embodiments, what is shown to the left of the main panoramic image from the head-aimed camera will be to the left of where the head-aimed camera is currently looking. The fifth camera can be mounted on the remote vehicle to face rearwardly and slightly downwardly to provide the operator with a good view for backing up.

In accordance with various embodiments, known video processing electronics can be utilized to merge the four 90°-spaced cameras together to create a panoramic image, which can be overlaid on the video stream from the head-aimed camera without inducing latency into the main video image from the head-aimed camera. In accordance with certain embodiments, the same process can be performed for the back-up camera image. In various embodiments of the present teachings, an operator interface can be prepared in a known manner to allow the operator to select among different view modes.

To maintain control of the remote vehicle at higher speeds, it can be desirable to keep visual latency for the operator-received video below 100 ms. Driving performance typically decreases with any measurable latency. Further, although vision can be a critical teleoperation interface, video requires a high communication bandwidth. The present teachings contemplate utilizing, for example, H.264 digital video codec to create a low-latency, high-quality, low-bandwidth transmission protocol that is compliant with the H.264 specification. In accordance with certain embodiments, the video codec can use a technique that is sometimes called "distributed key-framing" and is describe below.

In digital video, a keyframe is a single, complete picture of a video frame, compressed in a similar manner as a JPEG photo. Low latency digital video sends every video as a keyframe. As long as there is sufficient bandwidth, the result is good quality, high frame rate, and low latency. Time-based and motion-based compression schemes, such as MPEG-4, use P-frames that contain only incremental changes from the previous frame. A video stream can have the same apparent quality as the original analog image using periodic keyframes along with P-frames that are only about 5% to about 10% of the size of a keyframe (which can also be called an I-frame). A high motion video can have a single keyframe every second, which accounts for about half of the bandwidth utilized. However, transmission of the keyframe in a bandwidth-constrained environment can cause a 500 ms latency in the video image.

The distributed keyframe technique breaks a single keyframe into groups of macroblocks. If there are 300 macroblocks in a video frame and 30 frames per second, then keyframe data for 10 macroblocks would be sent along with P-frame data for the other 290 macroblocks in each video frame. The result is an entirely new keyframe each second, but only about 17 ms of latency due to keyframe transmission delays. An additional technique that can improve teleoperation in a bandwidth-constrained environment includes setting the quality factor for the macroblocks higher in a center of an image than in its periphery. Biasing quality to the center of the frame can cut video bandwidth in half without any perceptual difference to the operator. Quality biasing can be particularly useful in embodiments of the present teachings employing head-aiming, because the operator naturally keeps objects of interest in his center of vision. In certain embodiments, in macroblocks within a frame having motion counter to the overall image motion, the quality factor can be locally increased, making the moving object have sharper detail.

In various embodiments, two techniques can be utilized to reduce the impact of signal noise and errors on video quality. The first technique is flexible macroblock ordering, wherein each slice of a video frame is broken into macroblocks typically measuring 16×16 pixels. In a 640×480 video frame, there would be 30 slices, each containing 40 macroblocks. The video encoder buffers an entire slice at a time in order to compress it (about 3 milliseconds). If the macroblocks are transmitted in scan order, from left to right, then any radio noise during the transmission of that slice would corrupt a contiguous part of that slice. On the other hand, if the macroblocks are transmitted by first sending odd-numbered macroblocks, and then even-numbered macroblocks, a brief bit of noise would only knock out every other macroblock along a portion of the slice. Error masking algorithms can be used to fill in the missing information by analyzing the image information in the four adjacent macroblocks The second technique includes making the video more robust using a second low-resolution version behind the high-resolution video. If macroblocks in the high-resolution video are lost, the low resolution video will show through in those spots until new keyframe macroblocks can be used to fill in the detail. Further, when IP packets are dropped, old packets need not be transmitted if an updated P-frame monoblock is requested that skips over the lost data and provides incremental changes from the last good data. When the P-frame data gets large, new P-frame data can be provided for the macroblocks.

The Remote Vehicle Platform

The present teachings can be implemented on, for example, an iRobot® Packbot® or an iRobot® Warrior™ 700 platform. The iRobot® Warrior™ 700 is a next-generation explosive ordnance disposal (EOD) robot. The Warrior is equipped with two sets of treads connected at a forward axle. Outer (flipper) treads can rotate 360°, giving the Warrior™ increased mobility over rough terrain. The Warrior™ is about 54 cm wide and about 45.7 cm tall. With flippers fully retracted, the Warrior™ is about 88.9 cm long. The Warrior™ can climb a 45° slope, 45° stairs, or a 47 cm step, and can cross a 61 cm gap. The Warrior™ weighs about 129.3 kg, can carry a payload of greater than 68 kg, and has a maximum speed of about 15 kph. To assist in navigation, the Warrior™ is typically equipped with sensors for obstacle avoidance, intelligent payload positioning, an IMU, and an optional compass and GPS.

FIG. 1 illustrates an exemplary embodiment of a remote vehicle adapted for high-speed travel in accordance with the present teachings. The illustrated remote vehicle 100 can be constructed in accordance with U.S. Pat. No. 6,431,296, the disclosure of which is incorporated by reference herein in its entirety. As disclosed in U.S. Pat. No. 6,431,296, the remote vehicle typically includes main tracks and forward (flipper) tracks. The tracks can be cleated or otherwise high-friction. Each main track 110 can be driven by at least one drive hub (also referred to as a pulley), typically a front hub 200. A drive hub is provided on each side of the remote vehicle. The drive hubs are connected to each other and driven by a drive shaft. The drive shaft itself is driven by at least one drive motor.

Rear hubs or pulleys 300 are typically provided at a rear portion of each track and are typically driven by the track. However, they can also be driven by a drive shaft. Each flipper also comprises a cleated or otherwise high-friction track surrounding both a drive hub or pulley and a driven hub or pulley. The axis or center of each flipper drive hub is aligned with an axis or center of an adjacent main track drive hub and can be driven by the same drive shaft and motor(s) as the main track drive hub. Teeth on an outer surface of each hub engage recesses on an inner surface of a respective track, so that rotation of the hub dictates motion of the track and vice versa.

In accordance with various embodiments of the present teachings, wheels W, for example the illustrated standard 20-inch spoked bicycle wheels shown in FIG. 1, can be attached to the remote vehicle hubs 200, 300 to be driven by the remote vehicle hubs. One skilled in the art will understand that various other types and sizes of wheels having an increased diameter can be employed in accordance with the present teachings. Although the illustrated remote vehicle 100 does not include flippers, the present teachings contemplate embodiments wherein flippers are also provided on the remote vehicle. In such a case, the wheels W can be provided on an outside or an inside of the flippers, but preferably on the outside. The wheels W, if provided on an outside of the flippers, would attach to a hub of the flippers as would be appreciated by those skilled in the art. The method of attachment could be similar to, or the same as, the below-described exemplary method of attaching the wheels W to the main track hubs 200, 300.

Figure 4:
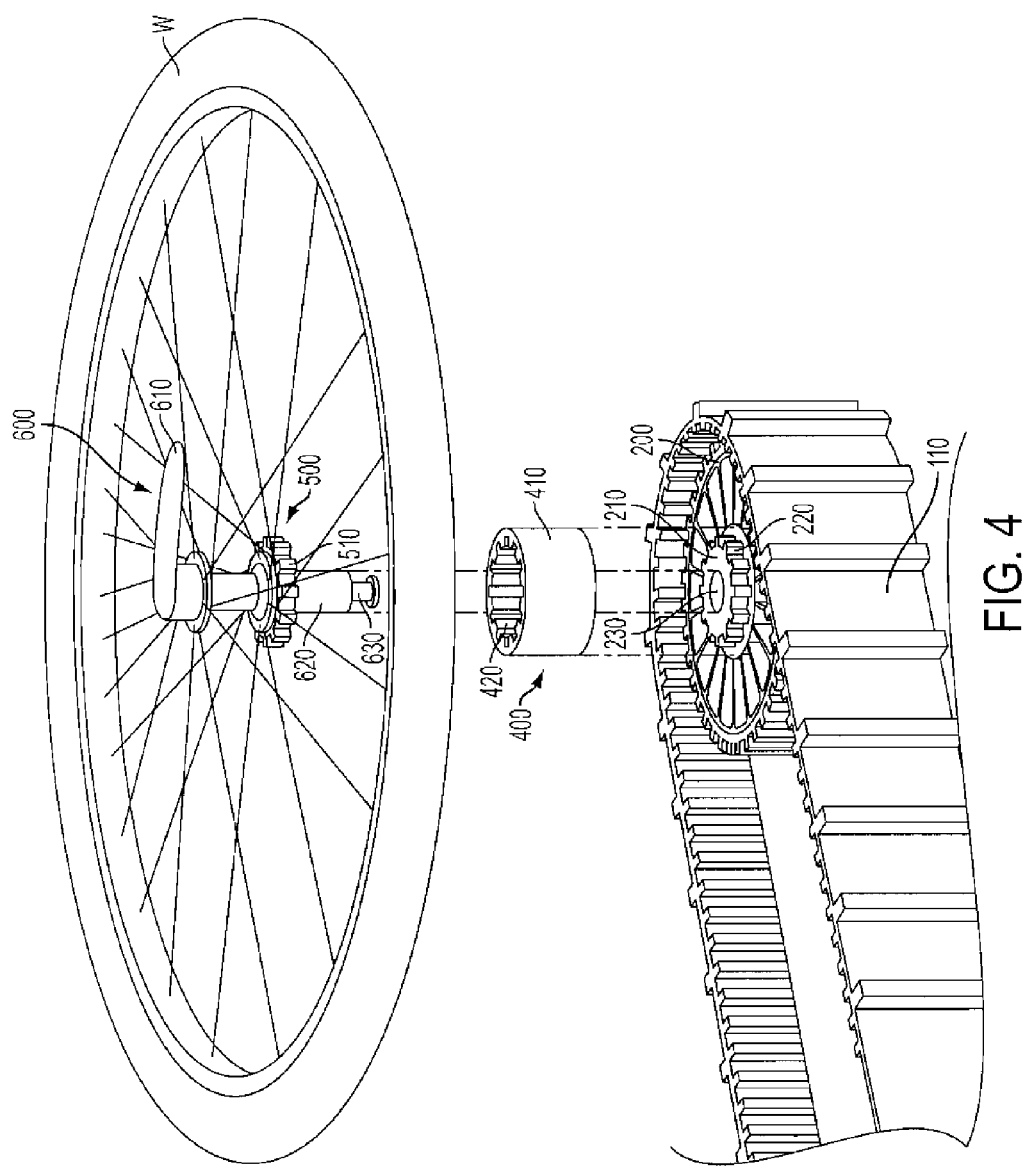
FIG. 4 is an exploded view of an exemplary embodiment for mounting a wheel to a hub of an unmanned ground vehicle.
Figure 5:
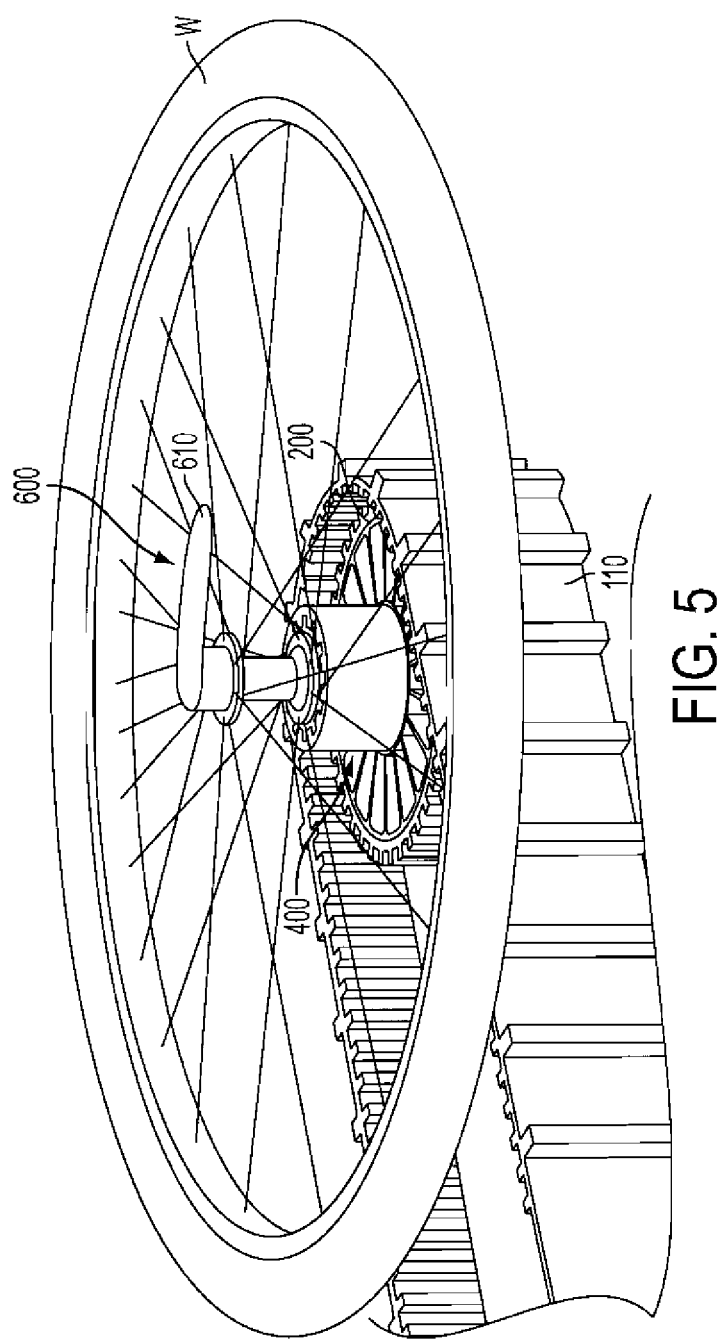
FIG. 5 is a perspective view of an exemplary embodiment of a wheel mounted to a hub of an unmanned ground vehicle.
Figure 6:
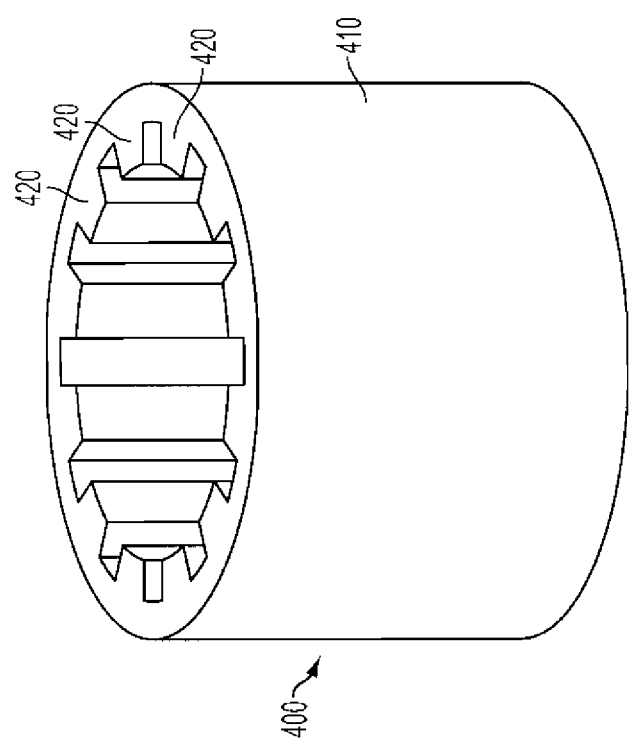
FIG. 6 is a perspective view of an exemplary embodiment of a coupler for mounting a wheel to a hub of an unmanned ground vehicle in accordance with certain embodiments of the present teachings.

FIG. 4 is an exploded view of an exemplary embodiment for mounting a wheel W to a hub 200 of, for example, a main track 110 of an unmanned ground vehicle. As can be seen, in the illustrated exemplary attachment embodiment, a coupler 400 is used to connect a cog 500 of the wheel W to the illustrated hub 200. The coupler 400 is generally cylindrical and can have a smooth outer surface 410 and inner teeth 420. On one side of the coupler 400, the inner teeth 420 of the coupler 400 mate with teeth 220 provided on a protrusion 210 extending from the hub 200. On the other side of the coupler 400, the inner teeth 420 of the coupler 400 mate with teeth 510 on the cog 500 attached to an axis of the wheel W. The coupler 400 thus allows rotation of the illustrated hub 200 to be transferred to rotation of the wheel W.

To fasten the wheel W (e.g., releasably) to the illustrated hub 200, a quick release mechanism 600 can be employed. The quick release mechanism 600 can be similar to those used in many bicycle tires, where a lever 610 pivots to lock the wheel W into place or release it. Locking of the wheel W to the illustrated hub 200 can be accomplished by (1) inserting a cylindrical male portion 620 of the quick release mechanism 600 through the coupler 400 and into an aperture 230 of the illustrated hub 200, and then (2) pivoting the quick release lever 610 to lock the male portion 620 within the aperture 230. The aperture 230 can extend through the illustrated hub 200 as well as into a portion of the associated connecting (e.g., drive) axle or shaft.

The initial fit of the male portion 620 of the quick release mechanism 600 within the aperture 230 can be an interference fit. However, pivoting of the quick release lever 610 of the quick release mechanism 600 can cause the male portion 620 to expand, thus locking the male portion 620 within the aperture 230 via a friction fit. Expansion of the male portion 620 of the quick release mechanism 600 can be accomplished by providing a male portion 620 that is deformable and a plunger-like portion 630 that is pulled by the quick release lever 610 to move toward the quick release lever 610 a distance to compressing the male portion 620 so that it expands outwardly to create the friction fit within the aperture 230. Pivoting the quick release lever 610 in an opposite direction releases the plunger-like portion 630 so that the male portion can retract inwardly to regain the original interference fit between the male portion 620 and the aperture 230 so that the wheel can be released from the hub as needed.

In accordance with certain embodiments of the present teachings, the drive system for the wheels W can be rear wheel drive (RWD), front wheel drive (FWD), or all wheel drive (AWD). Certain embodiments of the present teachings are capable of performing more than one of rear wheel drive (RWD), front wheel drive (FWD), and all wheel drive (AWD), and can allow the user or the remote vehicle controller to select among the three drive types. To achieve front wheel drive, the wheels W attached to the front hubs 200 of the remote vehicle 100 are engaged to rotate with the front hubs and be driven thereby. The wheels W attached to the rear hubs 300 of the remote vehicle are not engaged to rotate with the rear hubs 300 and therefore are not driven by the rear hubs 300. To achieve rear wheel drive, the wheels W attached to the rear hubs 300 of the remote vehicle are engaged to rotate with the rear hubs 300 and be driven thereby. The wheels W attached to the front hubs 200 of the remote vehicle are not engaged to rotate with the front hubs 200 and therefore are not driven by the front hubs 200. To achieve all wheel drive, the wheels W attached to the front hubs 200 of the remote vehicle are engaged to rotate therewith and be driven thereby, and the wheels W attached to the rear hubs 300 of the remote vehicle are also engaged to rotate therewith and be driven thereby.

The present teachings contemplate selective driving engagement of the rear wheels W and/or the front wheels W using, for example, a solenoid in the connection of the wheels W to the hubs, as would be understood by those skilled in the art to allow selective driving engagement of a wheel with its associated hub. Solenoids need not be employed for selective driving engagement of the wheels and hubs if the drive system type (i.e., RWD, FWD, AWD) will not be alterable during use of the remote vehicle.

Even when only a single axle of the remote vehicle is driven (e.g., the front axle and thus front hubs 200), for example by a drive motor, the directly driven axle and associated hubs are engaged with and drive the track that surrounds each associated hub (e.g., main track 110) and that track is engaged with and drives another hub (e.g., rear hub 300). Thus, both the front and rear hubs to which wheels are attached are typically driven, whether directly or indirectly, by a drive motor. Thus, both the front and rear wheels can be driven by locking them to respective hubs to rotate the wheels therewith.

The wheels W are provided to allow increased remote vehicle speed via their increased diameter that, as those skilled in the art will readily appreciate, allows the remote vehicle to cover a greater distance for a single axle revolution, and can also provide a reduced-friction interface between the remote vehicle and the ground. In certain embodiments of the present teachings, a remote vehicle including wheels W for increased speed can also utilize the above-described immersive telepresence and semi-autonomous behaviors to assist the operator in driving the high-speed remote vehicle. Increased speed provided by the wheels W can be advantageous in a number of applications, for example explosive ordnance disposal (EOD) and building clearing operations.

In certain applications, a combination of high speed travel afforded by the wheels and rough-terrain stability afforded by the tracks may be desirable. Such an application may include an EOD operation where the remote vehicle must travel to the site of the explosive quickly, but then must be able to traverse varied terrain (e.g., climb rubble and curbs) and/or attain certain predefined poses that are possible only by utilizing the tracks for mobility. In such applications, the high speed wheels can be releasably attached to the remote vehicle so that they can be jettisoned by the operator when the remote vehicle is within a predetermined distance of a target or encounters terrain requiring use of the tracks. In certain embodiments of a remote vehicle utilizing such releasable wheels, the wheels can be low-cost, commercially available wheels intended for easy replacement in an instance where jettisoned wheels are left behind or damaged.

In accordance with various embodiments, the jettisoning mechanism can include a known doorknob-type latching mechanism driven (rotated) for example by an existing articulator motor that is currently used to rotate the flippers with respect to the main tracks. Alternatively, a solenoid can be employed in a known manner for unlatching and jettisoning the wheels. Those skilled in the art will understand that a variety of other mechanisms can be employed for selectively jettisoning the wheels.

Because the wheels disclosed herein have an increased radius and thus an increased circumference, the remote vehicle can travel a greater distance for each revolution of the hub to which the wheels are attached. Thus, for a given remote vehicle rpm ability, greater speeds are attainable. In accordance with an embodiment of the invention employing a 20-inch wheel as illustrated, speeds can be increased about three-fold. For a PackBot® 500, typically having a maximum speed of about 4.5 mph without wheels, such 20-inch tires can increase maximum attainable speed to about 14 mph. For a PackBot® 510, typically having a maximum speed of about 5.8 mph without wheels, such 20-inch tires can increase maximum attainable speed to about 18 mph.

Certain embodiments of the present teachings can employ a smaller wheel than is shown in the embodiment of FIG. 1, and can increase the remote vehicle's maximum speed by replacing the remote vehicle's existing high-torque, low-speed gears with lower-torque, higher-speed gears. This replacement can be advantageous when the remote vehicle is not predicted to need increased torque to drive its high friction tracks. Smaller wheels can be advantageous in lowering the remote vehicle's center of gravity, thus making the remote vehicle less likely to roll over at high speeds.

In addition, the present teachings contemplate using an automatic, two-speed transmission assembly for small motors, such as the transmission assembly set forth in U.S. Provisional Patent Application No. 61/353,397, filed Jun. 10, 2010, the entire content of which is incorporated by reference herein. The two-speed transmission assembly can shift between a higher-torque, lower-speed output operational state and a lower-torque, higher-speed output operational state at any time, independent of a load on or a speed of the motor. The transmission assembly can be stable within its higher-torque and lower-torque operational states, requiring no energy to maintain its operational state. The transmission can be configured not to fail when switching between higher-torque and lower-torque operational states, and to shift between operational states by passing through a neutral operational state quickly. The transmission assembly can also be configured to absorb energy of the shifting process via a non-positive clutch.

Certain embodiments of the present teachings contemplate providing haptic feedback (e.g., via hand controls) or proprioceptive feedback (e.g., via a rumble seat) to the operator, including tactile feedback and haptic clues that indicate terrain type as well as contact with other objects. In such embodiments, the operator can feel vibrations of a given magnitude and shocks indicative of a bumpy terrain or impacts via, for example, had controls and or a rumble seat.

Other embodiments of the present teachings will be apparent to those skilled in the art from consideration of the specification and practice of the teachings disclosed herein. It is intended that the specification and examples be considered as exemplary only, with a true scope and spirit of the present teachings being indicated by the following claims.

What is claimed is:

1. A remote vehicle comprising:
a chassis;
a main track drive shaft spanning a width of the chassis;
at least one other shaft spanning a width of the chassis substantially parallel to the main track drive shaft;
first and second hubs connected to the main track drive shaft on opposite sides of the main track drive shaft, and third and fourth hubs connected to the other shaft on opposite sides of the other shaft, the first and second hubs being rotated by the main track drive shaft, the first and third hubs being located on a first side of the remote vehicle and the second and fourth hubs being located on a second side of the remote vehicle;
a first main track surrounding, engaging, and extending between the first and third hubs on a first side of the chassis, and a second main track surrounding, engaging, and extending between the second and fourth hubs on a second side of the chassis, the first main track being driven by rotation of the first hub and the second main track being driven by rotation of the third hub; and
a wheel connected directly or indirectly to each of the first, second, third, and fourth hubs, the wheel having a diameter that is greater than a diameter of a hub to which it is connected and being configured to directly contact a driving surface in use;
wherein each wheel releasably engages a respective hub of the remote vehicle, wherein each wheel is releasable using a jettisoning mechanism controlled by an operator upon arriving at a destination.

2. A system for providing enhanced operator control of a remote vehicle driving at increased speeds, the system comprising:
a head-mounted display configured to be worn by the operator and track a position of the operator's head;
a head-aimed camera mounted to the remote vehicle via a pan/tilt mechanism and configured to pan and tilt in accordance with the tracked position of the operator's head, the head-aimed camera transmitting video in distributed keyframes to be displayed to the operator via the head-mounted display as a main image;

at least one additional camera on the pan/tilt mechanism, the at least one additional camera configured to transmit video into the main image for an available inset view; and a computer running a behavior engine, the computer receiving input from the operator and one or more sensors, and being configured to utilize the behavior engine, operator input, sensor input, and one or more autonomous and/or semi-autonomous behaviors to assist the operator in driving the remote vehicle.

3. The system of claim 2, wherein the autonomous and/or semi-autonomous behaviors comprise an obstacle avoidance behavior.

4. The system of claim 2, wherein the autonomous and/or semi-autonomous behaviors comprise a street-following behavior.

5. The system of claim 2, wherein the autonomous and/or semi-autonomous behaviors comprise a perimeter-following behavior.

6. The system of claim 2, wherein the remote vehicle comprises wheels configured to directly contact a driving surface.

7. The system of claim 6, wherein the remote vehicle also comprises main tracks configured to directly contact a driving surface, each main track being driven by a drive hub and extending between the drive hub and a driven hub, and wherein the wheels are releasably mounted to the drive hubs and the driven hubs.

8. The system of claim 7, further comprising a flipper mounted on each side of the remote vehicle, external to each main track of the remote vehicle, each flipper including a high-friction flipper track surrounding a flipper drive hub and a flipper driven hub, an axis of each flipper drive hub being aligned with an axis of an adjacent main track drive hub and being driven by the main track drive shaft.

9. The system of claim 8, wherein at least two of the wheels are configured to be mounted to the flipper drive hub at a location outside of the flippers.

10. The system of claim 8, wherein at least two of the wheels are configured to be mounted between a main track drive hub and a flipper drive hub.

11. The system of claim 7, wherein each wheel comprises a cog and each hub comprises a protrusion, and a coupler is configured to connect each wheel cog to a respective hub protrusion.

12. The system of claim 11, wherein the coupler is generally cylindrical, having inner teeth configured to engage teeth provided on the protrusion of the hub.

13. The system of claim 12, wherein the inner teeth of the coupler also engage teeth provided on the cog of the wheel, and wherein the coupler allows rotation of each hub to be transferred to a respective wheel.

14. The system of claim 13, further comprising a quick release mechanism configured to releasable lock each wheel to a respective hub.

15. The system of claim 14, wherein the quick release mechanism comprises a lever that pivots to lock the wheel to a respective hub and release the wheel from the respective hub.

16. The system of claim 15, wherein the quick release mechanism further comprises a cylindrical male portion and a plunger.

17. The system of claim 16, wherein locking a wheel to a respective hub comprises inserting the cylindrical male portion of the quick release mechanism through the coupler and into an aperture of the respective hub, and pivoting the lever of the quick release mechanism to lock the male portion within the hub aperture.

18. The system of claim 2, wherein the autonomous and/or semi-autonomous behaviors comprise a straight line dynamic handling behavior.

19. The system of claim 2, wherein the autonomous and/or semi-autonomous behaviors comprise a turning dynamic handling behavior.

20. The system of claim 2, wherein the head-aimed camera is configured to transmit video using flexible macroblock ordering.

21. The system of claim 2, wherein the head-aimed camera is configured to transmit a first high-resolution video and a second lower-resolution video behind the first high-resolution video.

22. A method for operating a remote vehicle comprising both high-friction tracks and wheels having a diameter that is greater than hubs around which the high-friction tracks extend, each wheel being selectively engaged with a corresponding hub, the method comprising:

driving the remote vehicle to a destination at a high speed using a head-aimed camera and a head-mounted display while the wheels are selectively engaged, wherein the head-mounted display is configured to be worn by an operator and track a position of the operator's head, and wherein the head-aimed camera is mounted to the remote vehicle via a pan/tilt mechanism and configured to pan and tilt in accordance with the tracked position of the operator's head, the head-aimed camera configured to transmit video in distributed keyframes to be displayed to the operator via the head-mounted display;

jettisoning the wheels using a jettisoning mechanism controlled by the operator upon arriving at the destination; and driving remote vehicle at a slower speed using the high-friction tracks after the wheels have been jettisoned.

* * * * *